US011965629B2

(12) United States Patent
Huang et al.

(10) Patent No.: US 11,965,629 B2
(45) Date of Patent: *Apr. 23, 2024

(54) ILLUMINATION DEVICE AND LAMP COMPRISING THE ILLUMINATION DEVICES

(71) Applicant: SAVANT TECHNOLOGIES LLC, East Cleveland, OH (US)

(72) Inventors: Hai Huang, Shanghai (CN); Xin Qian, Shanghai (CN); Kun Xiao, Shanghai (CN); Jie Gao, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,642

(22) Filed: May 30, 2023

(65) Prior Publication Data

US 2024/0003506 A1 Jan. 4, 2024

Related U.S. Application Data

(63) Continuation of application No. 17/881,385, filed on Aug. 4, 2022, now Pat. No. 11,698,171.

(30) Foreign Application Priority Data

Aug. 5, 2021 (CN) ........................ 202110898075.6

(51) Int. Cl.

| | |
|---|---|
| ***F21S 4/28*** | (2016.01) |
| ***F21K 9/232*** | (2016.01) |
| ***F21Y 103/10*** | (2016.01) |
| ***F21Y 115/10*** | (2016.01) |

(52) U.S. Cl.

CPC ................ *F21S 4/28* (2016.01); *F21K 9/232* (2016.08); *F21Y 2103/10* (2016.08); *F21Y 2115/10* (2016.08)

(58) Field of Classification Search

CPC ......... F21S 4/28; F21K 9/232; F21Y 2103/10

See application file for complete search history.

(56) References Cited

U.S. PATENT DOCUMENTS 11,698,171 B2 * 7/2023 Huang ...................... F21S 4/28 362/249.02
2010/0284188 A1 11/2010 Chen et al.
2015/0029735 A1 1/2015 Scordino et al.

FOREIGN PATENT DOCUMENTS

CN 103910987 A 7/2014
CN 210601095 U 5/2020
KR 100949106 B1 3/2010

* cited by examiner

*Primary Examiner* — Karabi Guharay

(74) *Attorney, Agent, or Firm* — WOOD IP LLC

(57) ABSTRACT

Provided is an illumination device comprising a support structure and a light-emitting component being provided on one side of the support structure. The support structure also has an opening on one of its sides and an optical component cooperating with the opening to form an accommodating space. The illumination device also comprises an integrally formed light transmission portion provided above a light-emitting side of the light-emitting component. The light transmission portion is configured to transmit light from the light-emitting component. The illumination device additionally comprises a plurality of sealing portions being integrally formed.

20 Claims, 6 Drawing Sheets

3

--PRIOR ART--

--PRIOR ART--

3

ILLUMINATION DEVICE AND LAMP COMPRISING THE ILLUMINATION DEVICES

CROSS-REFERENCE TO RELATED APPLICATIONS

This application is a continuation of U.S. patent application Ser. No. 17/881,385, filed Aug. 4, 2022, now granted as U.S. Pat. No. 11,698,171, which claims the benefit of Chinese Patent Application Serial Number 202110898075.6, filed Aug. 5, 2021, both of which are herein incorporated by reference.

DESCRIPTION

Field of Technology

The present application relates to the technical field of illumination. More particularly, the present application relates to an illumination device adopting an optical component which comprises a light transmission portion and sealing portions integrally prepared by co-extruding a hard material and a soft material, and a lamp comprising the illumination devices.

Background

A lamp using light-emitting diode (LED) chips has characteristics of high luminous efficiency, power reduction and long service life, and therefore is applied more and more widely. However, when the LED chip emits light, the temperature of the LED chip itself increases continuously, and in a continuous illumination operation, if heat generated by the LED chip cannot be dissipated in time, the LED chip will be damaged. Therefore, the problem of heat dissipation in lamps using LED chips has been a concern in the industry.

In addition, due to the sensitivity of the LED chip to water vapor and moisture, if the water resistance and moisture penetration resistance of a lamp housing of an LED lamp are poor, the possibility of LED lamp failure will be increased.

In a traditional common LED lamp as shown in FIG. 1, a housing of the LED lamp is made in an integrated manner so as to improve the water resistance performance of the housing of the LED lamp; however, in this case, due to the integrated housing of the LED lamp, the heat dissipation performance of the housing is poor.

In view of the heat dissipation problem of the housing of the LED lamp, a corn lamp is proposed. As shown in FIG. 2, each LED chip strip is enclosed by an individual housing; however, as moisture and/or water penetrate through gaps at connection positions of the individual housings, the possibility of LED lamp failure will be increased.

Additionally, the enclosed design of the traditional common LED lamp of FIG. 1 has poor thermal performance and high cost. Furthermore, the water resistance design of the illumination device shown in FIG. 2 has a poor water resistance effect.

In addition, in the prior art, in order to solve the heat dissipation problem and the water resistance problem of the LED lamp, Chinese patent publication no. CN 103910987 A discloses an integrated LED lamp housing comprising a heat radiation portion and a light transmission portion, so as to improve the moisture resistance and/or water resistance performance of the LED lamp housing and the thermal conductivity of the LED lamp housing. Further, Korean patent No. KR 100949106 B1 discloses a lamp housing of an LED lamp, the lamp housing comprising a light transmission portion formed at one half side of the lamp housing and a heat dissipation unit formed at the other half side of the lamp housing. However, as the LED lamp housings disclosed in the two prior art documents are still integrated as shown in FIG. 1, the thermal conductivity thereof still needs to be improved. Furthermore, the lamp housing is an integrated LED lamp housing with one half side comprising a heat radiation portion and the other half side comprising a light transmission portion, the light transmission efficiency is actually sacrificed to obtain heat dissipation performance, and therefore the light efficiency of such an integrated LED lamp housing is poor.

The main purpose of the present application is to obtain a water resistance function without reducing the light efficiency of an LED lamp, while still maintaining good heat dissipation performance.

SUMMARY

In order to solve the heat dissipation problem, the water resistance problem and the problem of low light efficiency of an LED lamp, the present application proposes an illumination device in which a LED chip strip is enclosed by an integrated optical component which comprises a light transmission portion and sealing portions integrally prepared by co-extruding a hard material and a soft material, so that the illumination device and an LED lamp composed of the illumination devices can have an excellent heat dissipation performance, an excellent water resistance performance and a high light efficiency, and this also provides easier assembly (only requiring one step: i.e. inserting an optical component) and lower cost.

According to an embodiment of the present application, an illumination device is provided. The illumination device comprises a support structure and light-emitting component, the light-emitting component being provided on one side of the support structure, and an opening being provided on a side of the support structure opposite to the light-emitting component; wherein the illumination device further comprises an optical component cooperating with the opening of the support structure to form an accommodating space, the light-emitting component are accommodated in the accommodating space, and the optical component comprises: a light transmission portion provided above light-emitting side of the light-emitting component and configured to transmit light from the light-emitting component, the light transmission portion having edge portions, and the light transmission portion cooperating with the opening of the support structure by means of the edge portions so as to form the accommodating space; and sealing portions provided along the edge portions of the light transmission portion; the light transmission portion and the sealing portions are formed integrally.

In this manner, LED chip strip is enclosed by using an integrated optical component comprising a light transmission portion and sealing portions, so that the illumination device formed in this way and a lamp formed by a plurality of such illumination devices can have an excellent heat dissipation performance, an excellent water resistance performance and a high light efficiency, and this also provides easier assembly (only requiring one step: i.e. inserting an optical component) and lower cost.

Further, according to an embodiment of the present application, the light transmission portion comprises: a main body portion configured to transmit the light from the light-emitting component; and fixing portions provided along the edge portions of the main body portion and configured to fix the main body portion on the support structure, wherein the fixing portions and the sealing portions are formed on the same surface of the main body portion, and the fixing portions are formed on inner sides or outer sides of the sealing portions with respect to edges of the edge portions.

In this way, the optical component can be more easily assembled onto the support structure, thereby reducing the assembly time and the labor costs.

Further, according to an embodiment of the present application, each of the sealing portions comprises: an embedded portion, the embedded portion extending from the surface of the main body portion to the interior of the main body portion, so as to be embedded in the main body portion; and a protruding portion, the protruding portion protruding outward from the surface of the main body portion.

In this way, the sealing portions are not easily separated from the light transmission portion, so that the optical component can be less likely damaged and the yield of the optical component can be increased.

Further, according to an embodiment of the present application, the embedded portion has a thread shape so as to be tightly embedded in the main body portion, or the embedded portion has a reverse cone shape extending from the interior of the main body portion to the surface of the main body portion, such that the embedded portion is embedded in the main body portion in an inverted snap form.

In this way, the degree of engagement between the sealing portions and the light transmission portion can be further increased.

Further, according to an embodiment of the present application, the main body portion is formed as a rectangular flat plate, and the sealing portions and the fixing portions are provided along two long sides of the flat plate.

Further, according to an embodiment of the present application, the fixing portions are formed as a clamping strip shape so as to fix the main body portion to the support structure in a snap-fitting manner.

In this way, the optical component can be mounted into the support structure in an insertion manner, so as to achieve fitting between the optical component and the opening of the support structure, and thus the optical component can be more easily assembled onto the support structure, thereby being able to reduce the assembly time and the labor costs.

Further, according to an embodiment of the present application, the sealing portions are provided along at least a part of each of the edge portions of the light transmission portion.

In this manner, the water-resistance sealing function of the illumination device can be achieved while the cost of the optical component can be reduced.

Further, according to an embodiment of the present application, the light transmission portion is made of transparent polycarbonate, polymethyl methacrylate (PMMA), or polystyrene resin, and the sealing portions are made of a thermoplastic rubber or a silicone resin.

Further, according to an embodiment of the present application, the sealing portions are made of a transparent, translucent or colored material.

Further, according to an embodiment of the present application, the melting temperature range of the material forming the light transmission portion is 175° C. to 185° C., and the melting temperature range of the material forming the sealing portions is 155° C. to 165° C.

Further, according to an embodiment of the present application, the support structure comprises a heat dissipation component for dissipating heat generated by the light-emitting component, and the light transmission portion is fixed on the heat dissipation component.

Further, according to an embodiment of the present application, the heat dissipation component comprises engagement portions, wherein the engagement portions comprise slots for receiving the sealing portions, and the light transmission portion seals the slots and is fixed to the engagement portions.

In this manner, excellent water resistance performance and heat dissipation performance of the illumination device can be achieved without making large changes to the structure of the illumination device.

Further, according to an embodiment of the present application, the light-emitting component comprises a light-emitting strip having a plurality of LED chips.

Further, according to an embodiment of the present application, the light transmission portion and the sealing portions are integrally formed by co-extrusion.

According to another embodiment of the present application, a lamp is provided. The lamp comprises a plurality of the described illumination devices.

Compared to lamps as shown in FIGS. 1 and 2 in the prior art, the lamp formed by a plurality of illumination devices having the described configuration can have an excellent heat dissipation performance, an excellent water resistance performance, and a high light efficiency, and this also provides easier assembly and lower cost.

Further, according to an embodiment of the present application, a plurality of illumination devices is combined together to form a cavity, wherein the cavity comprises a first open end and a second open end, and the lamp further comprises: a package provided at the first open end; and a cover component provided at the second end, wherein through holes are provided on end walls of the cover component and the package member and communicate with each other.

In this way, air convection can be formed in the cavity, so that heat in the cavity is quickly taken out, thereby increasing the heat dissipation efficiency.

By means of the illumination device of the embodiments of the present application applying the optical component proposed in the present application, as the main body portion of the housing of the illumination device and the main body portion of the housing of the lamp composed of a plurality of illumination devices is composed of light transmission portions, the light efficiency of the illumination device and the lamp composed thereby can be increased. Further, as the main body portion of the housing of the lamp composed of a plurality of illumination devices is not integrally formed, but formed by connecting the plurality of illumination devices, the heat dissipation performance of the lamp can be improved. In addition, as the optical component comprises sealing portions formed integrally with the light transmission portion, good water resistance performance of the illumination device and the lamp, simplified assembly, and reduction of labor cost can be achieved.

BRIEF DESCRIPTION OF THE DRAWINGS

The drawings of the description, constituting a part of the present application, are used for providing further understanding of the present application and the illustrative embodiments of the present application and illustrations thereof are used to explain the present application, rather than constitute inappropriate limitation on the present application. In the drawings.

DETAILED DESCRIPTION

It is to be noted that embodiments and the features in the embodiments of the present application can be combined with each other without conflicts. Hereinafter, the present application will be described in detail with reference to the accompanying drawings in combination with the embodiments.

It is to be noted that unless otherwise indicated, all technical and scientific terms used in the present application have the same meaning as commonly understood by one of ordinary skill in the art to which the present application belongs.

In the present application, unless specified to the contrary, the directional terms such as “upper”, “lower”, “top”, and “bottom” are generally used for the directions shown in the figures, or for the components themselves in vertical, perpendicular, or gravity directions; and likewise, for ease of understanding and description, “internal, external” refer to internal and external relative to the outline of each component itself, but the described directional terms are not used to limit the present application.

Figure 3:
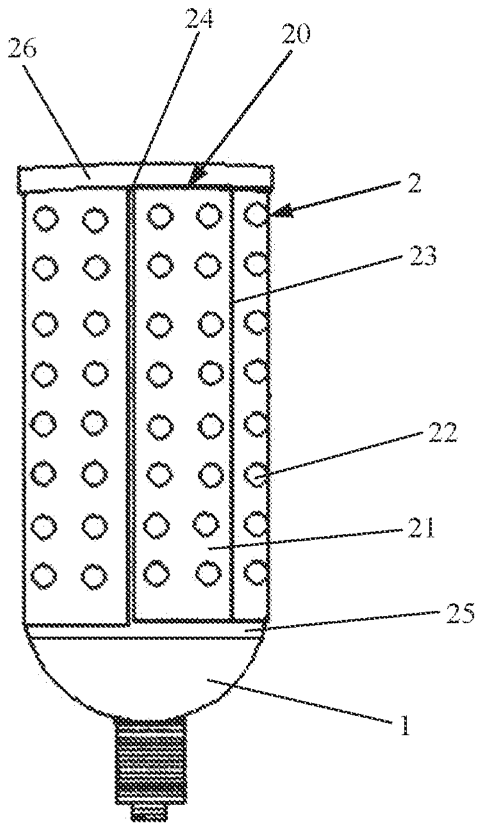
FIG. 3 is a schematic diagram of a lamp according to embodiments of the present application.

FIG. 3 is a schematic diagram of a lamp according to embodiments of the present application. Herein, taking a corn-shaped corn lamp as an example, but a lamp to which the optical component of the present application can be applied is not limited to the corn lamp, and can also be a long strip-shaped lamp such as a tubular lamp and similar shapes.

As shown in FIG. 3, a lamp 3 according to embodiments of the present application comprises a lamp base 1 and an illumination portion 2, the illumination portion 2 comprising a plurality of illumination devices 20. Each illumination device 20 comprises a support structure 21 and light-emitting component 22 provided on one side of the support structure 21, wherein an opening 23 is provided on a side of the support structure 21 opposite to the light-emitting component 22. Further, each illumination device 20 further comprises an optical component 24 (as further shown in FIGS. 4 and 5) cooperating with the opening 23 of the support structure 21 to form an accommodating space S (as shown in FIG. 8), the light-emitting component 22 being accommodated in the accommodating space S (as shown in FIG. 8).

In this example, the light-emitting component 22 is an LED light strip having a plurality of LED chips. The illumination portion 2 formed by a plurality of illumination devices 20 may have a polygonal cross section, and the lamp base 1 may have a circular cross section. The axis of the lamp base 1 coincides with the axis of the illumination portion 2.

Figure 4:
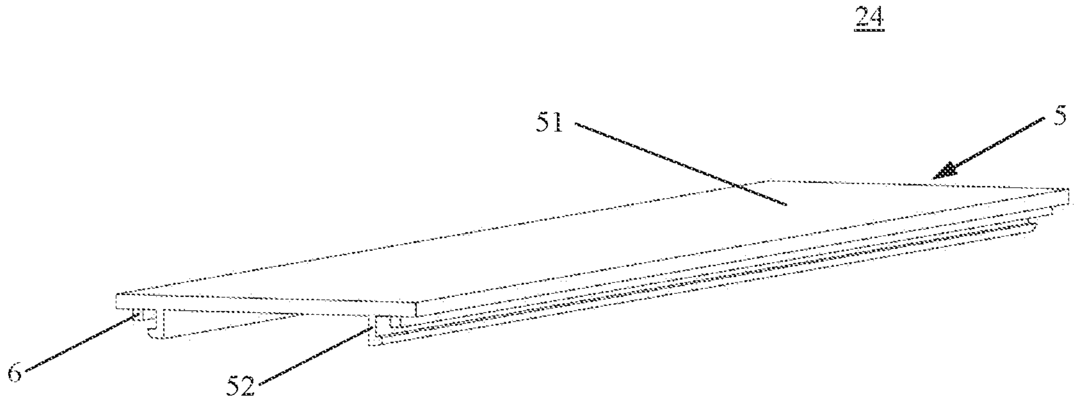
FIG. 4 is an overall view showing an optical component of an illumination device according to embodiments of the present application.
Figure 5:
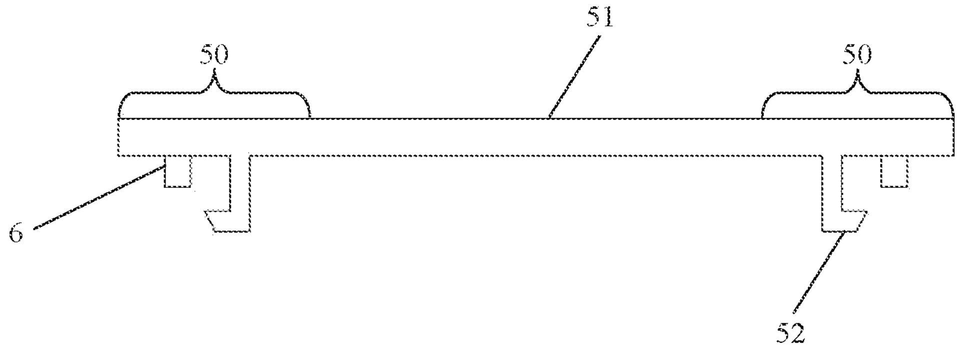
FIG. 5 is a cross-sectional view showing an embodiment of an optical component of an illumination device according to embodiments of the present application.
Figure 8:
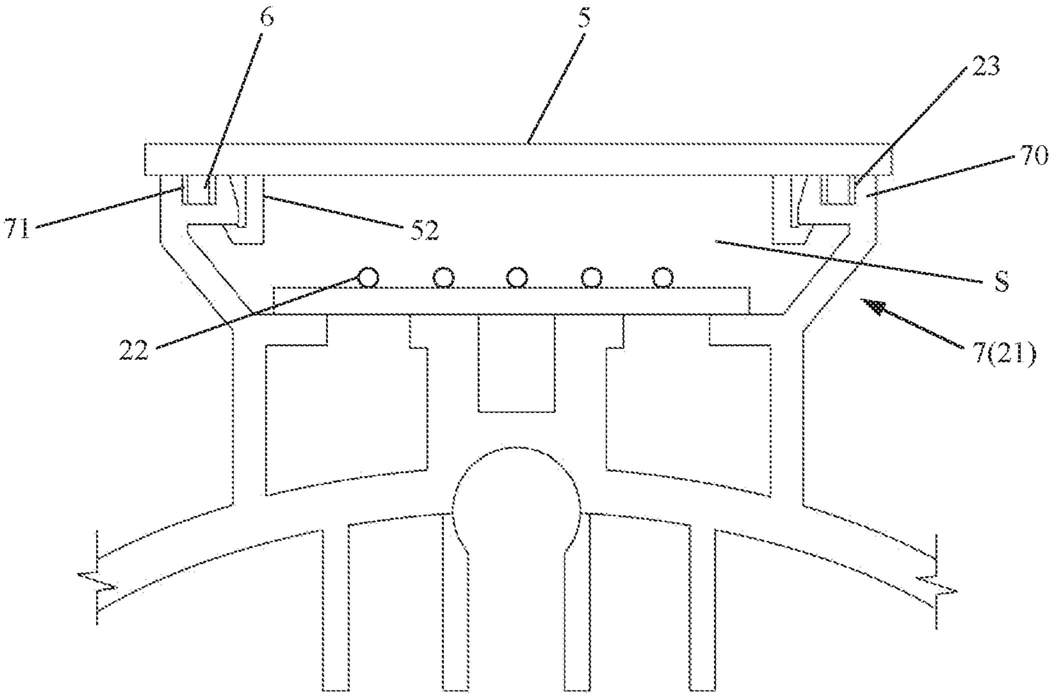
FIG. 8 is a view showing assembly between an optical component of an illumination device and a heat dissipation component of the illumination device according to embodiments of the present application.

As shown in FIGS. 4 and 5, the optical component 24 may comprise: a light transmission portion 5 provided above light-emitting side of the light-emitting component 22 and configured to transmit light from the light-emitting component 22, the light transmission portion 5 having edge portions 50, and the light transmission portion 5 cooperating with the opening 23 of the support structure 21 by means of the edge portions 50 so as to form the accommodating space S (as shown in FIG. 8); and sealing portions 6, provided along each of the two edge portions 50 of the light transmission portion 5, wherein the light transmission portion 5 and the sealing portions 6 can be integrally formed, for example, by means of co-extrusion. The present application is not limited to integrally forming the light transmission portion 5 and the sealing portions 6 by means of co-extrusion, and other methods capable of integrally forming the light transmission portion 5 and the sealing portions 6 can also be used.

In addition, it is to be noted that the light transmission portion 5 herein may transmit light by refracting the light from the light-emitting component 22.

Specifically, the light transmission portion 5 comprises: a main body portion 51, configured to transmit the light from the light-emitting component 22; and fixing portions 52, provided along the two edge portions 50 of the main body portion 51 and configured to fix the main body portion 51 on the support structure 21, wherein the fixing portions 52 and the sealing portions 6 may be provided along the two opposite edge portions 50 of the same surface of the main body portion 51, and optionally, the fixing portions 52 and the sealing portions 6 may be provided along at least a part of each of the two opposite edge portions 50 of the main body portion 51 of the light transmission portion 5.

As an example, as shown in FIG. 4, the main body portion 51 may be formed as a rectangular flat plate, and the sealing portions 6 and the fixing portions 52 are provided along two long sides of the flat plate, and the sealing portions 6 and the fixing portions 52 may be provided along at least a part of each of the two long sides of the flat plate. As an example, although not shown, optionally the main body portion 51 may be formed as a structure having a curved surface, for example, a semi-cylindrical shape.

The fixing portions 52 and the sealing portions 6 are formed on the same surface of the main body portion 51, and preferably the fixing portions 52 may be formed at the inner sides of the sealing portions 6 with respect to the edges of respective edge portions 50 of the two opposite edge portions 50. As shown in FIG. 4, the fixing portions 52 are formed at the inner sides of the sealing portions 6 with respect to respective long sides of the flat plate. As an alternative example, the fixing portions 52 may also be formed on the outer sides of the sealing portions 6 relative to the edges of respective edge portions 50 of the two opposite edge portions 50.

Figure 6:
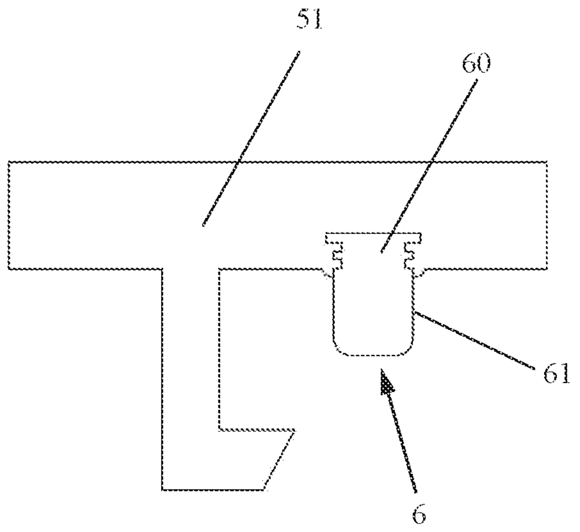
FIG. 6 is a cross-sectional partially enlarged view showing an embodiment of an optical component of an illumination device according to embodiments of the present application.

Further, as shown in the partially enlarged view of FIG. 6, each sealing portion 6 comprises: an embedded portion 60, the embedded portion 60 extending from the surface of the main body portion 51 to the interior of the main body portion 51 so as to be embedded in the main body portion 51; and a protruding portion 61, the protruding portion 61 protruding outward from the surface of the main body portion 51. Preferably, as shown in FIG. 6, the embedded portion 60 may have a thread shape so as to be tightly embedded in the main body portion 51.

Figure 7:
FIG. 7 is a cross-sectional view showing another embodiment of an optical component of an illumination device according to embodiments of the present application.

Alternatively, as shown in FIG. 7, FIG. 7 is a cross-sectional view showing another embodiment of an optical component of an illumination device according to embodiments of the present application. The embedded portion 60 may have a reverse cone shape extending from the interior of the main body portion 51 to the surface of the main body portion 51, such that the embedded portion 60 is embedded in the main body portion 51 in an inverted snap form.

As shown in FIGS. 4 and 5, the fixing portions 52 may be formed as a clamping strip shape so as to fix the main body portion 51 to the support structure 21 in a snap-fitting manner. Specifically, as shown in FIGS. 3 and 8, the support structure 21 may comprise a heat dissipation portion 7 for dissipating heat generated by the light-emitting component 22; the heat dissipation portion 7 may comprise engagement portions 70, the engagement portions 70 comprising slots 71 to receive the sealing portions 6, and the light transmission portion 5 sealing the slots 71 and being snap-fitted to the engagement portions 70 by means of the fixing portions 52 so as to be fixed to the heat dissipation portion 7.

Further, the light transmission portion 5 may be made of a light transmission resin such as transparent polycarbonate, polymethyl methacrylate (PMMA), or a polystyrene resin, and the sealing portions 6 may be made of a thermoplastic rubber or a silicone resin. The materials for producing the light transmission portion 5 and the sealing portions 6 of the present application are not limited to the described examples, and any hard material that can realize the function of the light transmission portion 5 and any soft material that can realize the sealing function of the sealing portions 6 can be used. The melting temperature range of the material forming the light transmission portion 5 may be 175° C. to 185° C., and the melting temperature range of the material forming the sealing portions 6 may be 155° C. to 165° C., so as to facilitate the co-extrusion of the light transmission portion 5 and the sealing portions 6.

Furthermore, preferably, the sealing portions 6 may be made of a transparent, translucent or colored material.

According to embodiments of the present application, the assembly of the optical component 24 and the support structure 21 can be completed by one step of inserting the optical component 24 into the support structure 21 of the illumination device 20, thereby manufacturing the illumination device 20, as described with reference to FIG. 8, the assembly process of the illumination device 20 is simplified in this way, and it is also ensured that the housing of the illumination device 20 has good heat dissipation performance and water resistance performance.

Referring back to FIG. 3, a plurality of illumination devices 20 of the lamp 3 is combined together to form a cavity (not shown), wherein the cavity comprises a first open end and a second open end, and the lamp 3 can further comprise: a package member 25, provided at the first open end; and a cover component 26, provided at the second open end, and through holes (not shown) may be oppositely provided on end walls of the package member 25 and the cover component 26 to be in communication with each other, so that air convection is formed in the cavity, thereby quickly bringing out the heat in the cavity, and increasing the heat dissipation efficiency. The plurality of illumination devices 20 may be joined together by adhering or mechanical fixing so as to form the illumination portion 2.

Figure 1:
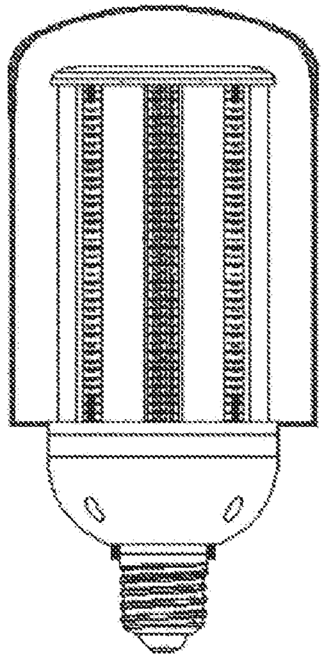
FIG. 1 shows a traditional common LED lamp in the prior art.
Figure 2:
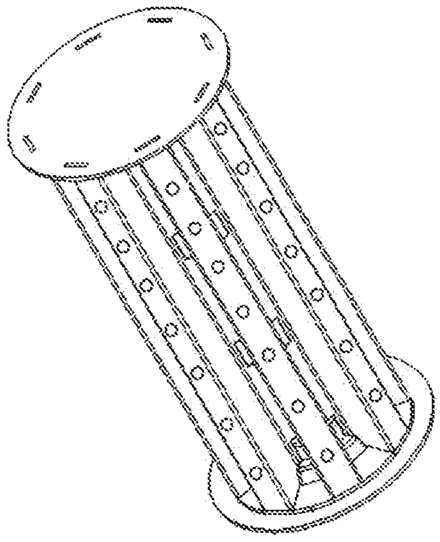
FIG. 2 shows a corn-shaped corn LED lamp in the prior art.

In the embodiments of the present application, as shown in FIG. 3, as the housing of the illumination portion 2 is not integrally enclosed as shown in FIG. 1, the heat dissipation efficiency can be further increased.

By means of the illumination device of the embodiments of the present application applying the optical component proposed in the present application, as the main body portion of the housing of the illumination device and the main body portion of the housing of the lamp composed of a plurality of illumination devices is composed of light transmission portions, the light efficiency of the illumination device and the lamp composed thereby can be increased. Further, as the main body portion of the housing of the lamp composed of a plurality of illumination devices is not integrally formed, but formed by connecting the plurality of illumination devices, the heat dissipation performance of the lamp can be improved. In addition, as the optical component comprises sealing portions formed integrally with the light transmission portion, good water resistance performance of the illumination device and the lamp, simplified assembly, and reduction of labor cost can be achieved.

Apparently, the described embodiments are merely a part rather than all of the embodiments of the present application. All other embodiments obtained by a person of ordinary skill in the art based on the embodiments of the present application without any inventive effort shall all fall within the scope of protection of the present application.

It should be noted that the terms used herein are for the purpose of describing particular embodiments only and are not intended to limit exemplary embodiments in accordance with the present application. As used herein, the singular form is intended to comprise the plural form as well, unless the context clearly indicates otherwise, and further it should be understood that the terms "comprises" and/or "comprising" when used in the present description, specify the presence of features, steps, operations, devices, components and/or combinations thereof.

It should be noted that the terms "first", "second" etc., in the description, claims, and accompanying drawings of the present application are used to distinguish similar objects, and are not necessarily used to describe a specific sequence or order. It should be understood that the terms so used may be interchanged where appropriate so that the embodiments of the present application described herein can be implemented in sequences other than those illustrated or described herein.

The described content merely relates to preferable embodiments of the present application and is not intended to limit the present application. For a person skilled in the art, the present application may have various modifications and variations. Any modifications, equivalent replacements, improvements, etc. made within the spirit and principle of the present application shall all belong to the scope of protection of the present application.

The invention claimed is:

1. An optical component comprising:

a light transmission portion comprising a plurality of edge portions;

a plurality of sealing portions (i) being provided along the plurality of edge portions (ii) having a first end being embedded in a surface of the light transmission portion and (iii) having a second end protruding outward from the surface of the light transmission portion;

a plurality of fixing portions (i) being provided along the plurality of edge portions on a same side of the surface of the light transmission portion as the plurality sealing portions and (ii) protruding outward from the surface of the light transmission portion;

wherein the optical component is arranged to be affixed to a support structure of an illumination device, the support structure comprising a plurality of engagement portions having a plurality of slots being configured to receive the plurality of sealing portions; and wherein as the plurality of sealing portions are received by the plurality of slots, the plurality of fixing portions are snap-fitted to the plurality of engagement portions so as to fix the light transmission portion to the support structure.

2. The optical component according to claim 1, wherein the light transmission portion further comprises:

a main body portion configured to transmit light from a light-emitting component;

wherein the plurality of fixing portions is configured to fix the main body portion on the support structure; and wherein the plurality of fixing portions and the plurality of sealing portions are formed on a same surface of the main body portion, and the plurality of fixing portions are formed on inner sides or outer sides of the plurality of sealing portions relative to edges of the plurality of edge portions.

3. The optical component according to claim 2, wherein each of the plurality of sealing portions comprises:

an embedded portion extending from a surface of the main body portion to an interior of the main body portion so as to be embedded in the main body portion; and a protruding portion protruding outward from the surface of the main body portion.

4. The optical component according to claim 3, wherein the embedded portion has a thread shape so as to be tightly embedded in the main body portion, or the embedded portion has a reverse cone shape extending from the interior of the main body portion to the surface of the main body portion, such that the embedded portion is embedded in the main body portion in an inverted snap form.

5. The optical component according to claim 4, wherein the main body portion is formed as a rectangular flat plate, and the plurality of sealing portions and the plurality of fixing portions are provided along two long sides of the rectangular flat plate.

6. The optical component according to claim 2, wherein the plurality of fixing portions is formed as a clamping strip shape so as to fix the main body portion to the support structure in a snap-fitting manner.

7. The optical component according to claim 2, wherein the support structure further comprises a heat dissipation component for dissipating heat generated by the light-emitting component, and the light transmission portion is fixed to the heat dissipation component.

8. The optical component according to claim 7, wherein the heat dissipation component comprises the plurality of engagement portions, and wherein the light transmission portion seals the plurality of slots and is fixed to the plurality of engagement portions.

9. The optical component according to claim 2, wherein the light-emitting component comprises a light-emitting strip having a plurality of LED chips.

10. The optical component according to claim 1, wherein the plurality of sealing portions are provided along at least a part of each of the plurality of edge portions of the light transmission portion.

11. The optical component according to claim 1, wherein the light transmission portion is made of a transparent polycarbonate, polymethyl methacrylate (PMMA), or a polystyrene resin, and the plurality of sealing portions are made of a thermoplastic rubber or a silicone resin.

12. The optical component according to claim 1, wherein the plurality of sealing portions is made of a transparent, a translucent or a colored material.

13. The optical component according to claim 1, wherein a melting temperature range of a material forming the light transmission portion is 175° C. to 185° C., and a melting temperature range of a material forming the plurality of sealing portions is 155° C. to 165° C.

14. The optical component according to claim 1, wherein the light transmission portion and the plurality of sealing portions are integrally formed by co-extrusion.

15. A lamp comprising:

a plurality of illumination devices, each illumination device comprising the optical component according to claim 1.

16. The lamp according to claim 15, wherein the plurality of illumination devices are combined together to form a cavity, and wherein the cavity comprises a first open end and a second open end, and the lamp further comprises: a package member, provided at the first open end; and a cover component, provided at the second open end, and through holes are oppositely provided on a plurality of end walls of the package member and the cover component to be in communication with each other.

17. The lamp according to claim 16, further comprising an illumination portion being formed by the plurality of illumination devices.

18. The lamp according to claim 15, wherein the optical component cooperates with an opening of the support structure to form an accommodating space.

19. The lamp according to claim 18, wherein a light-emitting component is disposed within the accommodating space.

20. The lamp according to claim 19, wherein the light-emitting component is an LED strip having a plurality of LED chips.

* * * * *